3,395,022
METHOD OF FREEZE DRYING FRUIT AND COMBINING IT WITH DRY CEREAL
Willard L. Vollink and Ralph Edward Kenyon, Battle Creek, Mich., and Stanley Barnett, Pearl River, and Howard Bowden, New City, N.Y., assignors to General Foods Corporation, White Plains, N.Y., a corporation of Delaware
No Drawing. Filed Nov. 12, 1963, Ser. No. 323,076
7 Claims. (Cl. 99—83)

ABSTRACT OF THE DISCLOSURE

An improved breakfast food has been prepared consisting of a dry cereal and freeze-dried fruit. The fruit is capable of rehydration in milk within 30 to 90 seconds. The moisture content of the fruit and of the cereal are maintained below 3 percent in order to achieve a shelf stable product.

---

This invention relates to improving the rehydration properties of fruit in milk.

It has always been difficult to dehydrate foods by conventional drying methods due to the tendency of certain foods to lose texture, flavor and appearance during drying. This is particularly true of fruits. The advent of freeze-drying wherein the water content of a material is removed by sublimation has made it possible to dehydrate fruit while still retaining its desirable appearance and flavor qualities. Freeze-dried fruit generally rehydrate quite rapidly in water. However, in the case where rehydration is to be accomplished in the presence of milk, the rehydration time has been found to be quite slow, thus rendering the fruit unsuitable for incorporation in the dried form with another food material, i.e. a dry cereal, such is corn flakes, bran flakes, or wheat flakes, all of which are normally consumed with milk. Due to the slow rate of rehydration, the cereal will be found to lose its desirable crispness and become mushy during the long time necessary for reconstitution of the fruit. If the cereal is eaten before full rehydration or reconstitution of the fruit has been achieved, then the cereal will be crisp but the fruit will have an undesirable texture characterized by a dry or cottony mouthfeel. However, the rehydration rate in milk cannot be made too rapid or the fruit will lose its texture and although the cereal will still be crisp, the fruit will be found to become mushy.

Therefore, it would be desirable if a method were devised for producing freeze-dried fruit capable of rehydration in milk within a period of 30–90 seconds thereby allowing the fruit to be eaten in the presence of milk and dry cereal, the dry cereal being in a crisp form while the fruit is in a fully reconstituted state.

It has now been discovered that improved freeze-dried fruit capable of rehydration in milk within 30–90 seconds can be produced by a process which comprises cooling the fruit to just above the freezing point of the water present in the fruit, then slowly freezing this water to develop a growth of ice crystals which expand the cellular structure of the fruit, and freeze-drying the slowly frozen fruit to a terminal moisture content of less than 3%.

The term "freeze-drying" as used in this invention, signifies drying by sublimation, preferably under a high vacuum, so that the slowly frozen crystals of water are removed from the fruit by vaporization from the solid state as distinguished from the liquid or semi-liquid state.

"Slow-freezing" according to this invention, generally involves transforming the moisture in the fruit into a growth of large ice crystals over a period of at least two hours, preferably 5–8 hours, in order to expand and partially rupture the cellular walls or tissues of the fruit. This mode of freezing is to be distinguished from normal or "rapid-freezing" methods wherein the water content of the fruit is frozen over a period of several seconds to several minutes to form a large number of minute ice crystals which do not rupture or expand the cellular tissues of the fruit. However, in the case of strawberries, it has been found that the freezing time for freezing whole strawberries (⅝″ to 1¼″ diameter) can be reduced from about 5–8 hours for whole berries to about 2 hours in the case where the strawberries are sliced in half after freezing and as much as 5–15 minutes when the strawberries are reduced to the size of about 3/16″ to ¼″ slices.

When slow-freezing, the freshly-picked fruit is subjected to freezing before the fruit has time to deteriorate in flavor and quality. Whole fruit is frozen to prevent juice and texture loss due to cutting the fruit in the unfrozen state. The fruit may then be cut after the freezing operation and prior to freeze-drying. The natural moisture content of the fruit at this point is in the range of about 80 to 90% and all of this moisture must be completely frozen prior to freeze-drying. In freezing this water slowly, the fruit is cooled to just above the freezing point of water, say 32° to 33° F., preferably as quickly as possible, and then subjected to slow-freezing at freezing temperatures of about −20° to 20° F., preferably at 0° to 15° F. Freezing is preferably accomplished in a static manner, i.e. a freezing room having little or no air flow over the fruit. Regardless of the freezing method used, it is essential that the water content be frozen over a sufficiently long period whereby large ice crystals are developed. These large ice crystals will, in turn, cause large pores to be formed and these pores will enable quick rehydration by the milk.

A temperature profile in cooling the fruit will show a gradually descending cooling curve from room temperature down to the point where the moisture content of the fruit begins to form ice crystals, i.e., 29° to 30° F. At this point, the temperature curve will level into a plateau and remain at this temperature until substantially all of the water is crystallized. This is the critical portion of the slow-freeze operation. The temperature of the fruit will then start to descend again, signifying that the moisture present in the fruit has been completely frozen. If the frozen fruit is not sliced and freeze-dried immediately, it will be desirable to further cool the fruit to below 0° F. and store the frozen fruit at below 0° F. in order to retard the activity of the enzymes and assure a stable product.

The frozen product may be sliced prior to freeze-drying in order to accelerate the drying time. Prior to slicing, the fruit is warmed to a semi-frozen state or a product temperature of between 10° to 25° F. The specific temperature will depend on the particular fruit. This is necessary to facilitate the cutting operation and prevent fragmentation of the fruit due to its brittle character at a product temperature of about 0° F. or below. The fruit is preferably sliced into 3/16″ to ¼″ thick sections, the fines are screened out and the sliced fruit is then freeze-dried immediately or again cooled to below 0° F. for storage purposes.

The frozen fruit is then placed on solid drying trays or meshed screens and placed in a commercial freeze-dryer wherein the slowly-formed ice crystals are sublimed under vacuum until a terminal moisture content of less than 3%, preferably less than 2% is attained. The sublimed ice crystals due to their size, leave large channeled openings in the fruit as the crystals vaporize and thereby enable quicker penetration when milk is used as the rehydrating medium.

The dried fruit is now ready to be combined with a dry breakfast cereal food, such as corn flakes adapted to be consumed with milk or cream. However, the slow-frozen, freeze-dried fruit due to its extreme porosity and high retention of volatile flavors, juices and enzymes is extremely hygroscopic. The dried fruit therefore, should be protected from atmospheric and in-package moisture and at no time should the moisture content of the dried fruit be allowed to exceed 4%.

In order to avoid excessive moisture pick-up, the dried fruit is combined with the cereal material and packaged under dry room conditions, i.e. a maximum relative humidity of 30% at 70° F. and a maximum residence time of 10–15 minutes for the fruit during the blending and packaging operation. These conditions will assure a minimum moisture pick-up of less than 1%. The freeze-dried fruit and dry breakfast cereal may be blended at various levels, but more usually in the range of 5–20% by weight of dried fruit to 80–95% by weight of cereal. Due to the hygroscopic nature of the freeze-dried fruit, the fruit-cereal mixture must be packaged in a relatively moisture impervious container which will assure a moisture level of less than 4% in the dried fruit during the period of storage before consumption of product.

A stable product is assured if the freeze-dried fruit is combined with a dry cereal, such as corn flakes, at a moisture level of less than 3%, that is, the moisture content of the fruit must be less than 3% and the moisture content of the cereal must be below 3%. Conventional corn flakes and other cereal products generally have a moisture content which is above 3%. Preferably, the in-package moisture range for the fruit will be 1 to 3 and that of the cereal will be 2 to 3%. At this range the cereal-fruit mixture can tolerate about a 1% moisture pick-up while still retaining its stability.

While this process has been described with reference to fruits in general, it is particularly applicable to strawberries, peaches, bananas and blueberries. In the case of strawberries, peaches, and bananas, the frozen fruit is preferably sliced to ³⁄₁₆″ to ¼″ thick sections after the fruit has been warmed to a semi-frozen state. In the case of blueberries, however, the whole berries are frozen, warmed to a semi-frozen state of 10° to 25° F., preferably about 23° F. and then pricked or pierced to develop pinholes in the skin and cellular structure of the berry. This is done without destroying the whole berry appearance, texture, and structure. The pricking operation enables the blueberries to be freeze-dried in a much shorter time.

This invention will now be described by reference to the following specific example.

Example 1

A charge of freshly picked strawberries was washed and then graded for uniformity. Strawberries having a particle size of about ¾″ to 1″ in diameter were then arranged in monolayers on freezing trays and the freezing trays were placed in a large freezing room having an ambient temperature of 0° F. The strawberries took about ½ hour to cool from room temperature to about 28° F. and about 6 hours for the water to be completely frozen at 28° F. The strawberries were then allowed to cool to 0° F. A cooling curve in which temperature was plotted against time showed a temperature profile wherein an initially relatively steep slope down to the freezing point of the moisture in the fruit was followed by a flat line or plateau during the actual change from a liquid moisture state to a frozen moisture state, the flat line again sloping rapidly when substantially all of the water was frozen and the product temperature lowered to 0° F. The strawberries remained in the plateau for 6 hours and in this time developed a growth of large ice crystals to partially rupture the cellular walls of the strawberries. The frozen strawberries were then stored at 0° F. to protect the strawberries against enzymatic or bacterial degradation arranged in mono-layer fashion on solid aluminum trays and freeze-dried in 10 lb. charges in a freeze dryer under a vacuum of 100 microns Hg, a platen temperature of 80° F. and a condenser temperature of —60° F. for about 20 hours until a terminal moisture content of 1.5% was attained.

The freeze-dried strawberries (moisture content 1.5%) were then combined with corn flakes (moisture content 2%) at a level of about 8–10% by weight strawberries and 90–92% corn flakes. The blending operation was conducted in a packing room having a relative humidity of 30% in a period of less than 10–15 minutes thereby limiting moisture pick-up of the strawberries to less than 1%. The strawberry corn flakes cereal was then packaged in a water resistant, wax-laminated foil liner which was placed inside a chip-board shell and enclosed with a wax-laminated overwrap. The packaged product having a terminal moisture content of less than 2.5% for the strawberries and about 2% for the corn flakes was stored in this form at 70° F. and 50% relative humidity for 3–6 months without any degradation in product quality.

At the end of this period the strawberries were found to reconstitute in milk or cream in about 60 seconds to a flavor, texture, and appearance close to that of fresh berries. The breakfast cereal could then be eaten within 1–5 minutes with the berries being fully reconstituted but not mushy and the cereal still in a crisp form.

Example 2

The procedure of Example 1 was followed with the exception that the frozen strawberries were kept in the freezing plateau for only 2 hours. The freezing temperature being —15° F. The strawberries were then frozen to below 0° F., stored and then warmed or tempered to about 23° F. in preparation for the cutting operation. Tempering was necessary to render the berries less brittle. The berries were then cut into halves, refrozen to below 0° F. and freeze-dried in about 18 hours to a terminal moisture of less than 1.5%. The dried berries were then blended with wheat flakes (moisture content 2.5%), packaged, stored and were found to reconstitute identical to the Example 1 product.

Example 3

The procedure of Example 2 was followed with the exception that the berries were frozen in a blast freezer having a temperature of 0° F. The strawberries were found to remain in the plateau for only 10 minutes in order to freeze the water content of the berries. The berries were then stored at 0° F., tempered to 25° F., sliced to ¼″ sections, refrozen to 0° F. and freeze-dried about 15 hours. The dried berries were blended, packaged, and stored for 3–6 months. The cereal was then served with milk and found to reconstitute identical to the Example 1 product.

Example 4

Peaches were lye peeled, cut into halves, pitted, and were then frozen according to the Example 1 procedure (being kept in the plateau for about 6 hours). The frozen peaches were stored at 0° F. The peaches were warmed to 25° F. in preparation for the cutting operation and then cut into equal sized wedges having a thickness of about ³⁄₁₆″ slices. The peaches were refrozen to 0° F., stored and then freeze-dried to a terminal moisture of 1–2%. The peaches were then blended with corn flakes similar to Example 1, packaged, stored for 3 months and were found to reconstitute with milk in about 80 seconds to a flavor, texture and quality similar to fresh peaches. The peaches did not become soggy within the normal 5–10 minute period for consumption of a breakfast cereal.

Example 5

Blueberries were washed, arranged on 1″ thick beds (2–3 berries thick) on freezing trays and frozen according to the procedure of Example 1, the berries remaining in the plateau for about 8 hours at a freezing room temperature of 10° F. The berries were stored at 0° F., warmed to 25° F. in preparation for the pricking operation and then the berries were passed through a pricking device which made minute pinholes in the skin of the berry without destroying the whole berry structure. The berries were refrozen to 0° F., freeze-dried to a terminal moisture of 1.5%, blended with corn flakes, packaged and stored according to the Example 1 procedure. The berries were then found to reconstitute in milk or cream within 40–50 seconds while giving a texture, taste, and quality similar to fresh blueberries.

Example 6

Bananas were peeled, arranged in monolayer fashion on freezing trays, and frozen in a freezing room having a temperature of 10° F. The bananas remained in the plateau for about 8 hours and were then cooled to 0° F. The bananas were warmed to 24° F., and sliced into ¼″ cross-section. The bananas were then freeze-dried to a terminal moisture of 1.5%, blended with wheat flakes, packaged and stored according to the procedure of Example 1. After storage the bananas were found to reconstitute in milk or cream within 80–90 seconds while giving a texture, taste and quality similar to fresh bananas.

While this invention has been described by reference to specific examples, it is to be limited only by the scope of the appended claims.

What is claimed is:

1. A process for producing improved freeze-dried fruit capable of rehydration in milk within 30–90 seconds which comprises cooling the fruit to the freezing point of the water in said fruit, freezing said water in from 5 minutes to 8 hours to develop a growth of ice crystals which expand the cellular structure of the fruit, further cooling said fruit to below 0° F., tempering the fruit to a temperature of from 10° F. to 25° F., dividing the tempered fruit into particulate pieces, cooling the particulate pieces to below 0° F., and freeze drying the particulate pieces to a terminal moisture content of less than 3%.

2. The process of claim 1 wherein the particulate pieces are from 3/16 to ¼ inch thick in at least one dimension.

3. The process of claim 1 wherein the dried fruit is combined with a dry breakfast cereal, said cereal being dried to a moisture content of from 2 to 3%, and packaging said fruit-cereal mixture at an in-package moisture level of below 3%.

4. The process of claim 3 wherein the fruit is strawberries, the water in said strawberries being frozen in about 2 hours, the strawberries being further cooled to below 0° F., the frozen strawberries being tempered to a product temperature of from 10° F. to 25° F., said tempered berries being sliced into halves having a thickness of from 5/16 to 5/8 inch, said sliced strawberries being cooled to below 0° F. prior to freeze-drying.

5. The process of claim 3 wherein the fruit is strawberries, the water in said fruit being frozen in from 5 to 15 minutes, the strawberries being further cooled to below 0° F., the frozen strawberries being tempered to a product temperature of from 10° to 25° F., slicing said tempered strawberries into particulate pieces having a thickness of from 3/16 to ¼ inch, said pieces being cooled to below 0° F. prior to freeze-drying.

6. The process of claim 3 wherein the fruit is peaches, said peaches being peeled, cutting said peaches in halves, pitting said peaches, freezing the water in said peaches in from 5 to 8 hours, cooling the peaches to below 0° F., tempering said peaches to a product temperature of from 10° to 25° F., further slicing said peaches into particulate pieces, and cooling said pieces to below 0° F. prior to freeze-drying.

7. The process of claim 3 wherein the fruit is bananas, peeling said bananas, freezing the water in said bananas in from 5 to 8 hours, cooling the bananas to below 0° F., tempering said bananas to a product temperature of from 10° F. to 25° F. slicing said bananas into particulate pieces, and cooling said bananas prior to freeze-drying.

References Cited

UNITED STATES PATENTS 2,643,419 11/1954 Gager _____ 99—83
2,278,472 4/1942 Musher _____ 99—104

OTHER REFERENCES

Loesecke: Drying and Dehydration of Foods, 1955, Reinhold Publishing Co., p. 31.

RAYMOND N. JONES, *Primary Examiner.*

M. VOET, *Assistant Examiner.*